US012668008B2

(12) United States Patent　(10) Patent No.:　US 12,668,008 B2

Nakayama　(45) Date of Patent:　**\*Jun. 30, 2026**

(54) ADJUSTMENT METHOD FOR SHUT-OFF NOZZLE, SHUT-OFF NOZZLE, INJECTION DEVICE, AND INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( \* ) Notice: Subject to any disclaimer, the term of this patent is extended or adjusted under 35 U.S.C. 154(b) by 116 days.

This patent is subject to a terminal disclaimer.

(21) Appl. No.: 18/634,904

(22) Filed: Apr. 13, 2024

(65) Prior Publication Data

US 2024/0351256 A1　Oct. 24, 2024

(30) Foreign Application Priority Data

Apr. 20, 2023　(JP) ................................. 2023-069059

(51) Int. Cl.
B29C 45/23　(2006.01)
B29C 45/74　(2006.01)
(52) U.S. Cl.
CPC ............ B29C 45/231 (2013.01); B29C 45/74 (2013.01)
(58) Field of Classification Search
CPC .. B29C 45/231; B29C 2045/235; B29C 45/58
See application file for complete search history.

(56) References Cited

U.S. PATENT DOCUMENTS 4,886,439 A * 12/1989 Hehl ....................... B29C 45/17
425/562

FOREIGN PATENT DOCUMENTS

| JP | H03-274125 A | | 12/1991 | |
|----|----|----|----|----|
| JP | H07223241 A | * | 8/1995 | ......... B29C 45/2806 |
| JP | 2005-329655 A | | 12/2005 | |
| JP | 2021109429 A | * | 8/2021 | |
| JP | 2021109430 A | * | 8/2021 | |

\* cited by examiner

*Primary Examiner* — Virak Nguon
(74) *Attorney, Agent, or Firm* — Potomac Law Group, PLLC

(57)　　　　ABSTRACT

An adjustment method for a shut-off nozzle provided in an injection device, the shut-off nozzle including a nozzle portion having an injection flow path and a needle hole, a needle valve movably insertable into the needle hole, a cylinder component driving the needle valve, a bracket rotatably support the cylinder component at a rear end, and a fixing device fixing the bracket to a fixing member of the injection device, the adjustment method including: releasing the fixing device to allow the bracket to slide by a predetermined width relative to the fixing member, heating the injection device and the nozzle portion, driving the cylinder component to bring the needle valve to a most forward position and adjusting a slide position of the bracket, and fastening the fixing device to fix the bracket to the fixing member.

16 Claims, 12 Drawing Sheets

ADJUSTMENT METHOD FOR SHUT-OFF NOZZLE, SHUT-OFF NOZZLE, INJECTION DEVICE, AND INJECTION MOLDING MACHINE

CROSS-REFERENCE TO RELATED APPLICATIONS

This application is based on and claims priority under 35 USC 119 from Japanese Patent Application No. 2023-069059 filed on Apr. 20, 2023, the entire content of which is incorporated herein by reference.

TECHNICAL FIELD

The present disclosure relates to an adjustment method for a shut-off nozzle provided in an injection molding machine, a shut-off nozzle, an injection device including a shut-off nozzle, and an injection molding machine.

BACKGROUND

A shut-off nozzle provided in an injection device of an injection molding machine can prevent so-called drooling by opening and closing a flow path of an injection nozzle through which an injection material flows. There are various types of shut-off nozzles, for example, as described in JPH03-274125A, there is a shut-off nozzle including a nozzle portion and a needle valve provided obliquely to the nozzle portion. This type of shut-off nozzle has an oblique hole, that is, a needle hole, extending from an outer peripheral surface of the nozzle to an injection flow path in the nozzle. A needle valve is inserted into the needle hole so as to be movable forward and backward. When the needle valve is moved forward, the injection flow path is closed, and when the needle valve is moved backward, the injection flow path is opened.

SUMMARY

In this type of shut-off nozzle, the needle valve is driven by a cylinder unit to move forward and backward. A bracket is attached to a predetermined fixing member of the injection device by a bolt, and the cylinder unit is rotatably supported by the bracket at a rear end thereof. When the shut-off nozzle is attached to the injection device, the bracket is positioned with respect to the fixing member by a knock pin or the like. By this positioning, the needle valve is appropriately inserted into the needle hole. Then, the needle valve is supposed to smoothly slide into the needle hole. However, when the heating cylinder and the nozzle portion of the injection device are heated by a heater to be ready for operation, an insertion state of the needle valve with respect to the needle hole may be misaligned. When the misalignment occurs, the needle valve is caught when moving forward and backward in the needle hole.

Illustrative aspects of the present disclosure provide an adjustment method for a shut-off nozzle that adjusts a needle valve to an appropriate insertion state with respect to a needle hole.

Other problems and novel features will become apparent from description of the present description and the accompanying drawings.

One illustrative aspect of the present disclosure is an adjustment method for a shut-off nozzle provided in an injection device. The shut-off nozzle includes: a nozzle portion having an injection flow path in an axial direction formed therein and a needle hole reaching the injection flow path from an outer peripheral surface of the nozzle portion; a needle valve movably insertable into the needle hole to open and close the injection flow path; a cylinder component configured to drive the needle valve in a moving direction; a bracket configured to rotatably support the cylinder component at a rear end; and a fixing device configured to fix the bracket to a fixing member of the injection device. The adjustment method includes: releasing the fixing device to allow the bracket to slide by a predetermined width with respect to the fixing member; heating the injection device and the nozzle portion by a heater; driving the cylinder component to bring the needle valve to a most forward position and adjusting a slide position of the bracket; and fastening the fixing device to fix the bracket to the fixing member.

According to the present disclosure, the shut-off nozzle can be adjusted such that the needle valve is appropriately inserted into the needle hole.

DETAILED DESCRIPTION

Figure 1:
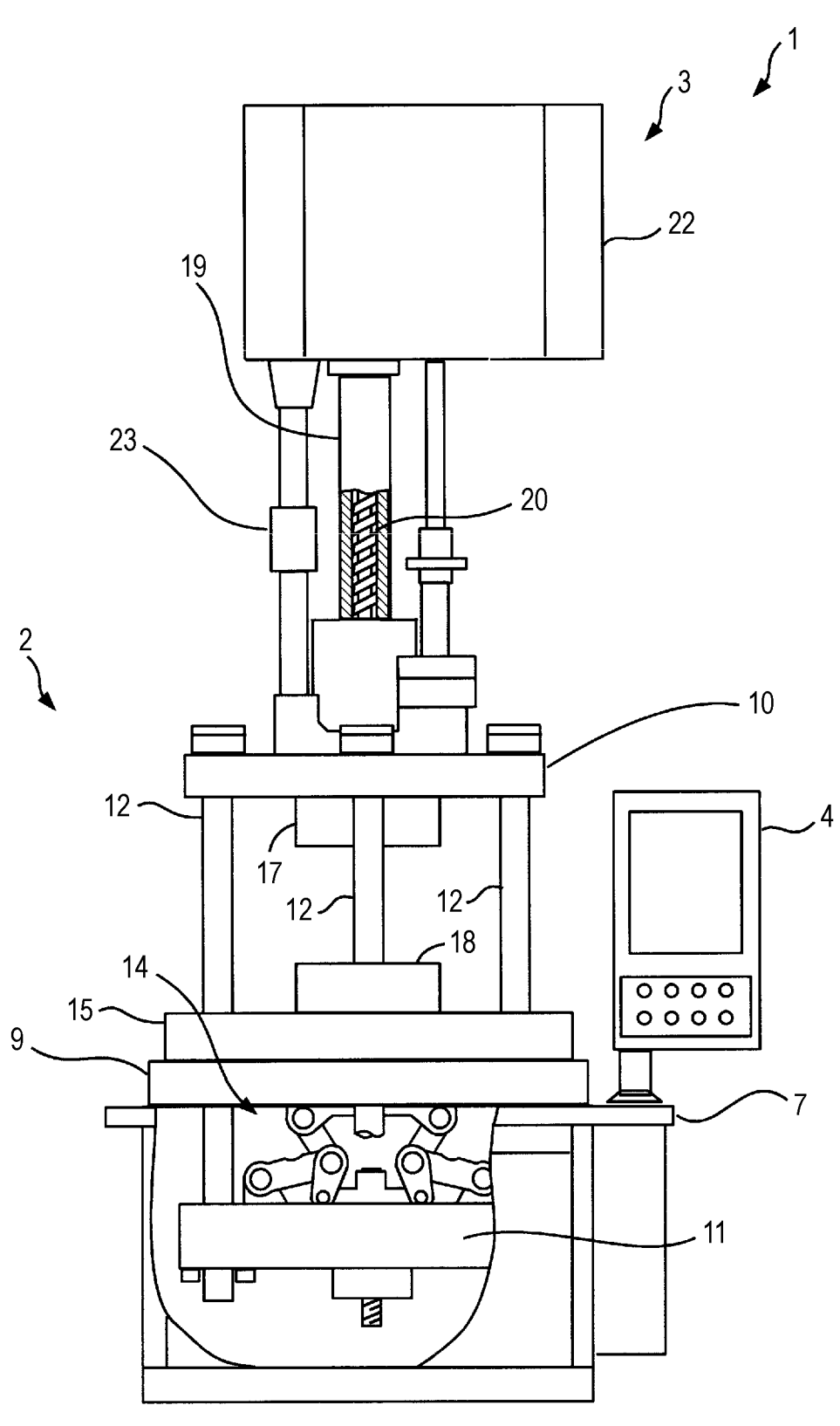
FIG. 1 is a front view showing an injection molding machine according to a first illustrative embodiment.

Hereinafter, specific illustrative embodiments will be described in detail with reference to the drawings. However, the present invention is not limited to the following illustrative embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

First Illustrative Embodiment

{Injection Molding Machine}

As shown in FIG. 1, an injection molding machine 1 according to a first illustrative embodiment is a so-called vertical injection molding machine. The injection molding machine 1 includes a toggle-type mold clamping device 2 and an injection device 3. The injection molding machine 1 includes a control device 4 configured to control the mold clamping device 2 and the injection device 3.

{Mold Clamping Device}

The mold clamping device 2 is a so-called vertical mold clamping device. The mold clamping device 2 includes a fixed platen 9 fixed to a bed 7, an upper movable platen 10 provided above the fixed platen 9, and a lower movable platen 11 provided in the bed 7. In this illustrative embodiment, the upper movable platen 10 and the lower movable platen 11 are coupled by three tie bars 12, 12, . . . . A toggle mechanism 14 is provided between the lower movable platen 11 and the fixed platen 9. A turntable 15 is provided on the fixed platen 9. An upper mold 17 is provided on the upper movable platen 10, and a lower mold 18 is provided on the turntable 15. When the toggle mechanism 14 is driven, the upper mold 17 and the lower mold 18 are opened and closed.

{Injection Device}

Figure 2:
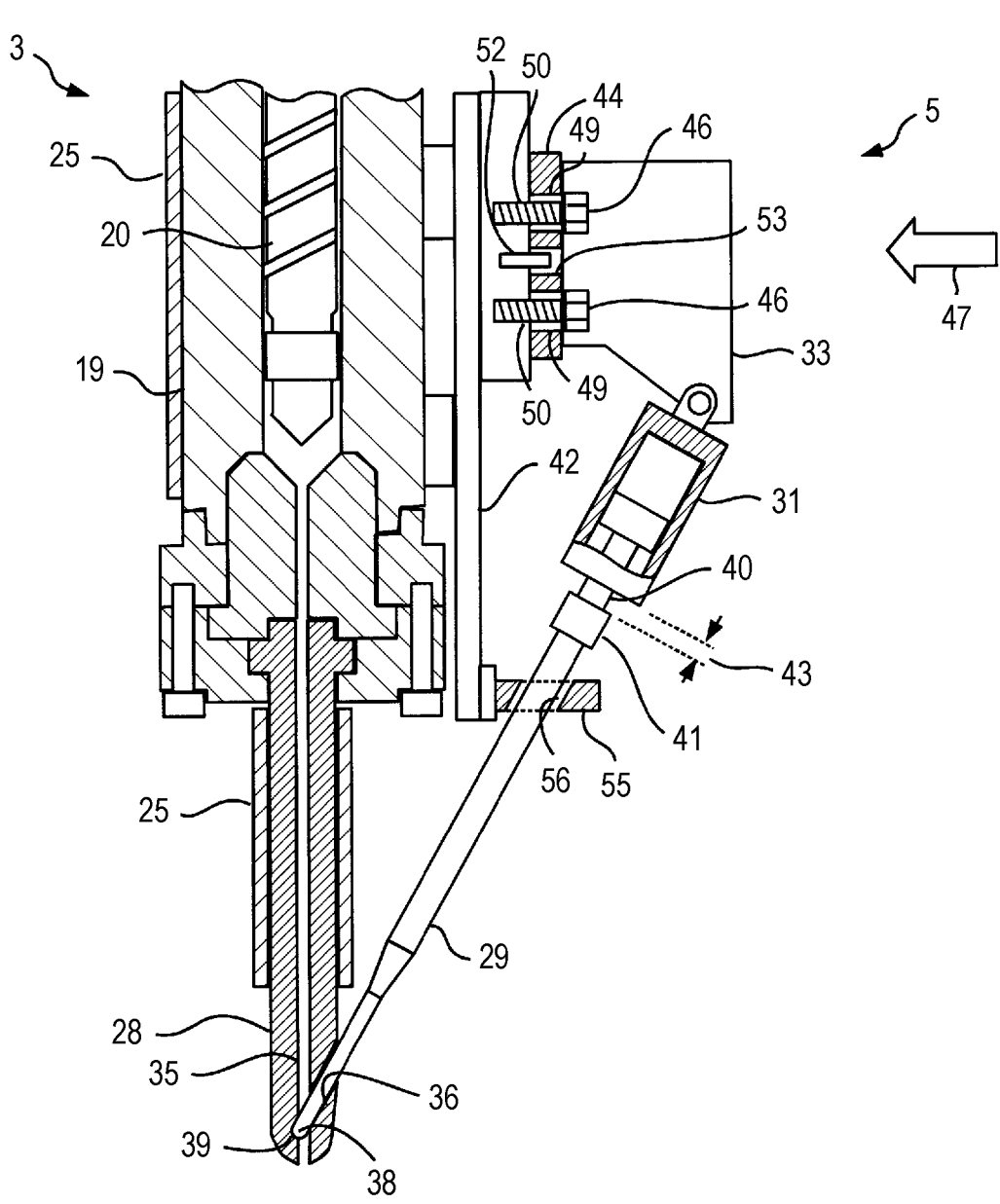
FIG. 2 is a front cross-sectional view showing a shut-off nozzle and a part of an injection device according to the first illustrative embodiment.

The injection device 3 is provided above the upper movable platen 10 of the mold clamping device 2. The injection device 3 includes a heating cylinder 19, a screw 20 provided in the heating cylinder 19, a screw driving device 22, and an elevating device 23 for elevating the entire injection device 3. As will be described in detail later, the heating cylinder 19 includes a shut-off nozzle 5 according to the first illustrative embodiment as shown in FIG. 2. The heating cylinder 19 and the shut-off nozzle 5 are provided with heaters 25, 25, . . . , and the heating cylinder 19 and the shut-off nozzle 5 are heated. An injection material is melted when heated by the heaters 25, 25, . . . , and is metered when the screw 20 is rotated. The injection material is injected by driving the screw 20 is driven in an axial direction.

{Shut-Off Nozzle}

Figure 4:
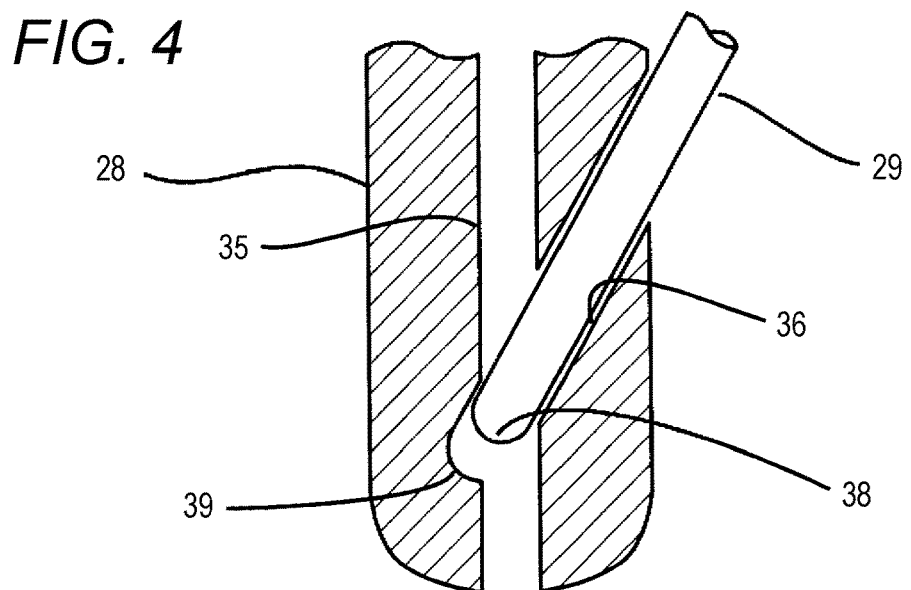
FIG. 4 is a front cross-sectional view showing a part of a nozzle portion and a part of a needle valve of the shut-off nozzle according to the first illustrative embodiment.

As shown in FIG. 2, the shut-off nozzle 5 according to the first illustrative embodiment includes a nozzle portion 28, a needle valve 29, a cylinder unit 31 configured to drive the needle valve 29, and a bracket 33 that supports the cylinder unit 31. An injection flow path 35 through which the injection material flows is formed in the nozzle portion 28. In this description, the axial direction refers to a direction of an axis of the nozzle portion 28, and the injection flow path 35 is formed in the axial direction. The nozzle portion 28 has a hole that reaches the injection flow path 35 from an outer peripheral surface thereof, that is, a needle hole 36. The needle hole 36 is formed obliquely with respect to the axial direction, and the needle valve 29 is inserted therein so as to be movable forward and backward. As shown in FIG. 4, a tip end portion of the needle hole 36 is formed into a spherical recess 39, and a head portion 38 of the needle valve 29 is formed in a hemispherical shape. When the needle valve 29 is moved forward, the head portion 38 is seated on the recess 39.

The needle valve 29 is configured to be driven by the cylinder unit 31. A rear end of the needle valve 29 is connected to a rod 40 of the cylinder unit 31 by a coupling 41. As described later, in a case where the adjustment of the shut-off nozzle 5 is appropriately performed, when the needle valve 29 is driven to a most forward position, an exposed length 43 of the rod 40 becomes a specified length. By checking the length 43, it is possible to determine whether or not the adjustment of the shut-off nozzle 5 is appropriate.

A rear end of the cylinder unit 31 is rotatably supported by the bracket 33. The cylinder unit 31 is driven by the supply of fluid. As described later, when the adjustment method for the shut-off nozzle 5 is performed, the bracket 33 is allowed to slide up and down, and the bracket 33 is caused to slide upward by a driving force of the cylinder unit 31. That is, since the bracket 33 is slid upward against the weight of the bracket 33, the driving force of the cylinder unit 31 is relatively large. The cylinder unit 31 may be driven by air or the like, but in the first illustrative embodiment, the cylinder unit 31 is driven by hydraulic pressure or the like having a relatively large driving force.

Figure 3:
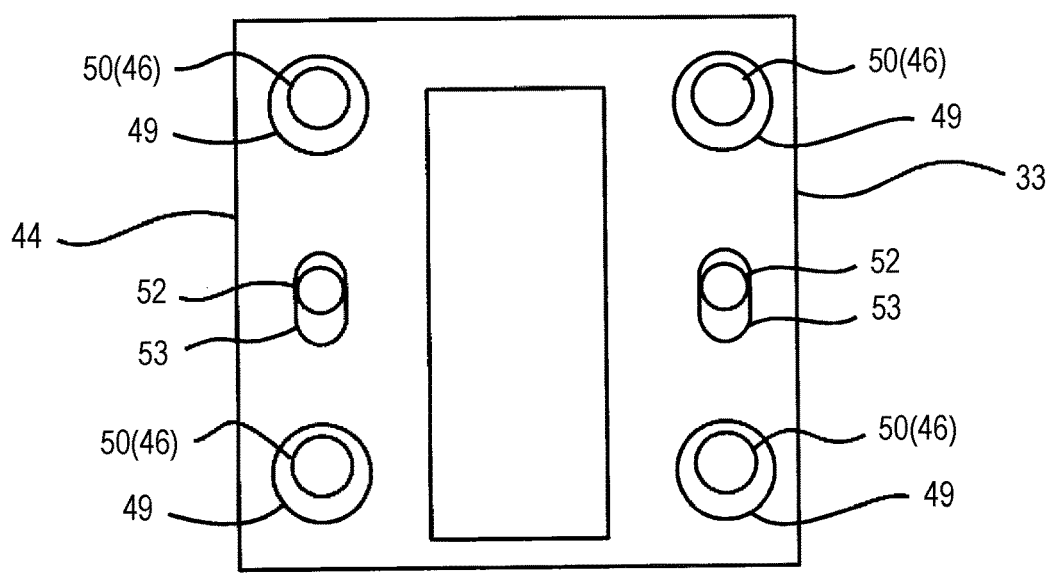
FIG. 3 is a side view of a bracket of the shut-off nozzle according to the first illustrative embodiment.

The bracket 33 is attached to a fixing member 42 provided in the injection device 3. A flange portion 44 is formed on the bracket 33. The flange portion 44 is fixed to the fixing member 42 by fastening bolts 46, 46, . . . . FIG. 3 shows the bracket 33 as viewed in a direction of an arrow 47 shown in FIG. 2. Four bolt holes 49, 49, . . . are formed in the flange portion 44. In FIG. 3, shaft portions 50, 50 of the fastening bolts 46, 46, . . . are shown. Diameters of the bolt holes 49, 49, . . . are larger than diameters of the shaft portions 50, 50. Therefore, when the fastening bolts 46, 46, . . . are loosened, the shaft portions 50, 50 of the fastening bolts 46, 46, . . . become movable within the range of the bolt holes 49, 49, . . . . That is, the bracket 33 can be slid with respect to the fixing member 42 (see FIG. 2) within a certain range.

As shown in FIGS. 2 and 3, in the first illustrative embodiment, knock pins 52, 52 are provided between the fixing member 42 and the bracket 33. The knock pins 52, 52 are embedded in the fixing member 42, and a part of at least one of the knock pins is exposed. As shown in FIG. 3, the bracket 33 has elongated guide holes 53, 53 formed therein. The exposed portions of the knock pins 52, 52 are inserted into the guide holes 53, 53. Accordingly, the knock pins 52, 52 is movable in a longitudinal direction along the guide holes 53, 53. That is, when the fastening bolts 46, 46, . . . are loosened, the bracket 33 is allowed to slightly slide with respect to the fixing member 42 in a state where a slide direction is regulated by the knock pins 52, 52.

As shown in FIG. 2, the fixing member 42 is provided with a guide portion 55 configured to support the needle valve 29 near a rear end thereof. An oblique through hole 56 is formed in the guide portion 55, and the needle valve 29 is inserted into the through hole 56. In the first illustrative embodiment, an inner diameter of the through hole 56 is slightly larger than a diameter of this portion of the needle valve 29, and the needle valve 29 is inserted gently with a slight clearance secured.

{Gauge}

Figure 5:
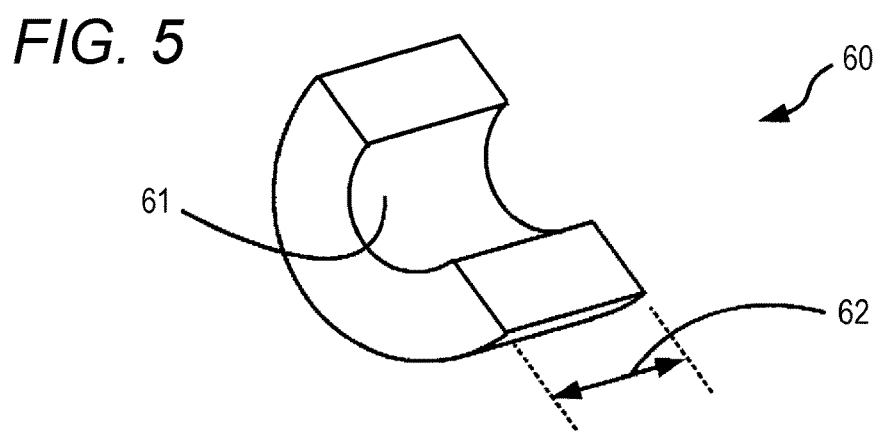
FIG. 5 is a perspective view showing a gauge according to the first illustrative embodiment.

In the adjustment method for the shut-off nozzle 5 (see FIG. 2) according to the first illustrative embodiment described below, when the cylinder unit 31 is driven to move the needle valve 29 to the most forward position, it is checked whether the length 43 of an exposed portion of the rod 40 is appropriate. FIG. 5 shows a gauge 60 for performing this check. The gauge 60 has a structure like a thick cylinder cut in half. An inner peripheral surface 61 of the gauge 60 has an inner diameter slightly larger than a diameter of the rod 40 (see FIG. 2) and is contactable with the rod 40. A width 62 of the gauge 60 corresponds to the length 43 of the rod 40, so that it can be checked whether the length 43 is an appropriate length.

{Adjustment Method for Shut-Off Nozzle}

Figure 6:
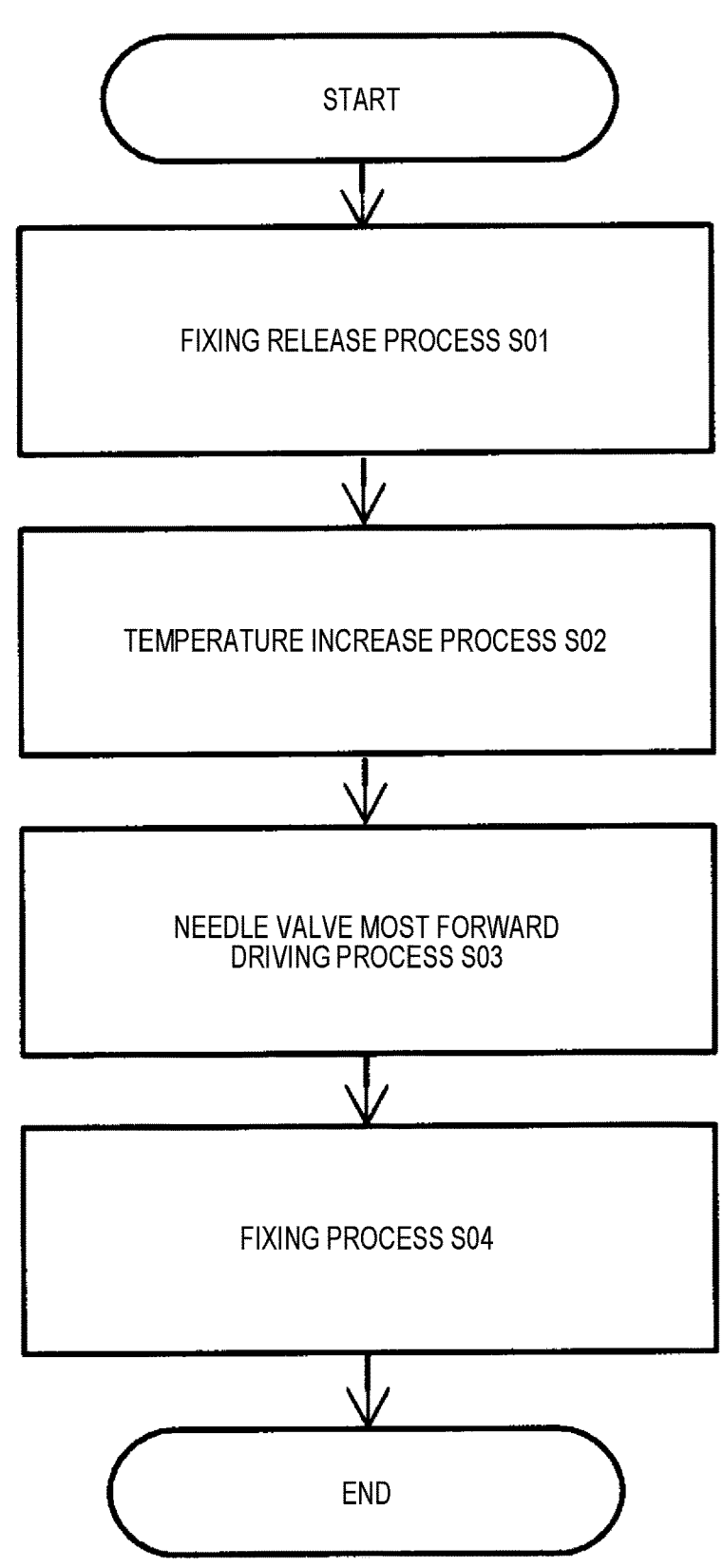
FIG. 6 is a flowchart showing an adjustment method for the shut-off nozzle according to the first illustrative embodiment.
Figure 7A:
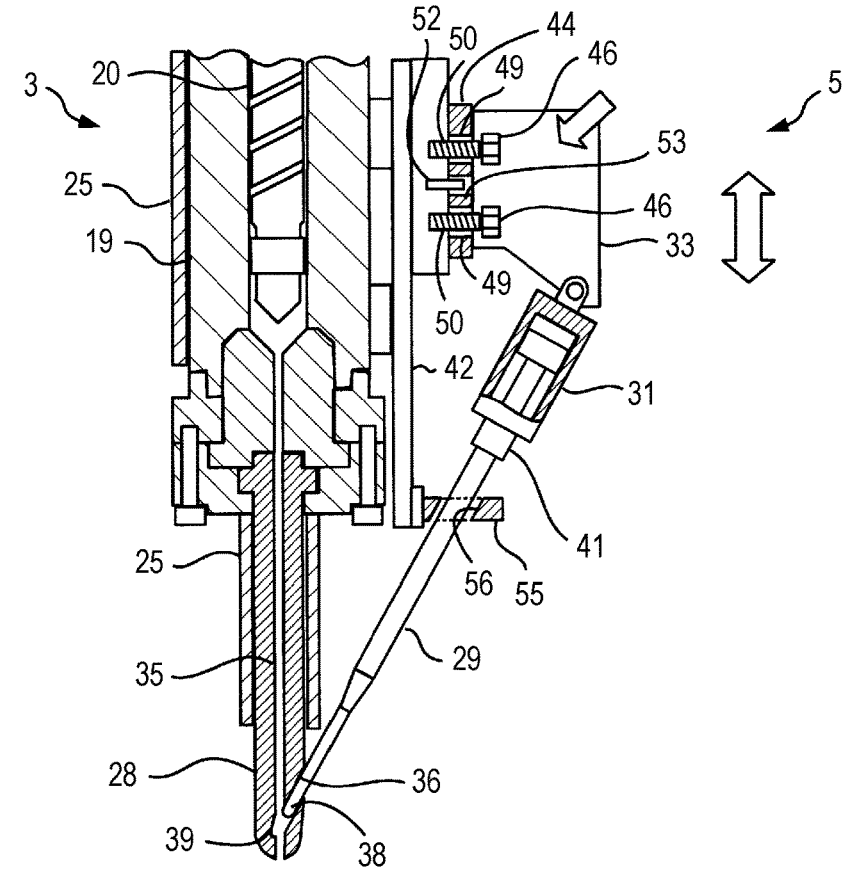
FIG. 7A is a front cross-sectional view of the shut-off nozzle according to the first illustrative embodiment.

An adjustment method for the shut-off nozzle 5 according to the first illustrative embodiment will be described. First, as shown in FIG. 6, a fixing release process (step S01) is performed. That is, as shown in FIG. 7A, the fastening bolts 46, 46 are loosened to release a fixed state of the bracket 33 to the fixing member 42. Then, the bracket 33 is allowed to slide within a predetermined range in a state where the slide direction is restricted in a vertical direction by the knock pins 52 and the elongated guide holes 53. Next, as shown in FIG. 6, a temperature increase process (step S02) is performed. That is, the heating cylinder 19 and the nozzle portion 28 are heated by the heaters 25, 25 (see FIG. 7A). Wait until the heating cylinder 19 and the nozzle portion 28 are heated to an operable state. Then, the heating cylinder 19 and the nozzle portion 28 slightly expand due to the thermal expansion.

Figure 7B:
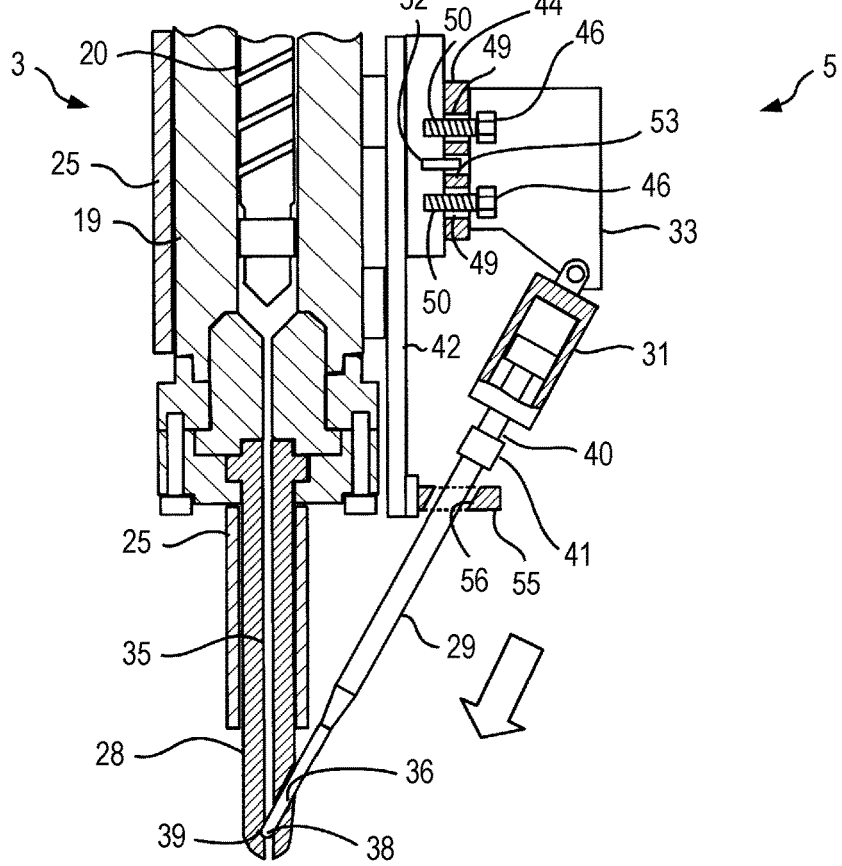
FIG. 7B is a front cross-sectional view of the shut-off nozzle according to the first illustrative embodiment.
Figure 7C:
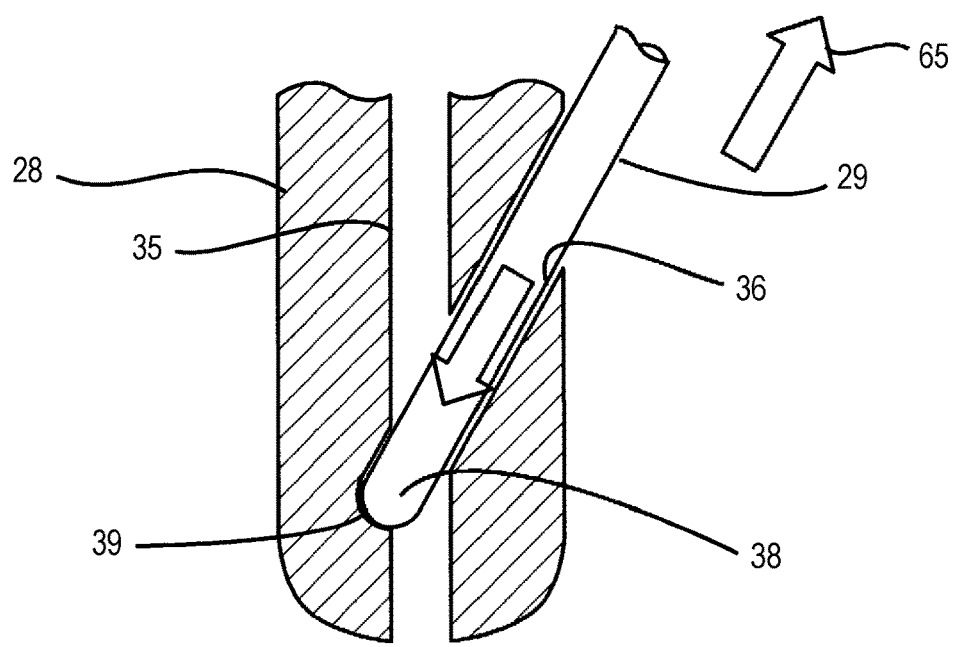
FIG. 7C is a front cross-sectional view showing a part of the nozzle portion and a part of the needle valve of the shut-off nozzle according to the first illustrative embodiment.
Figure 7D:
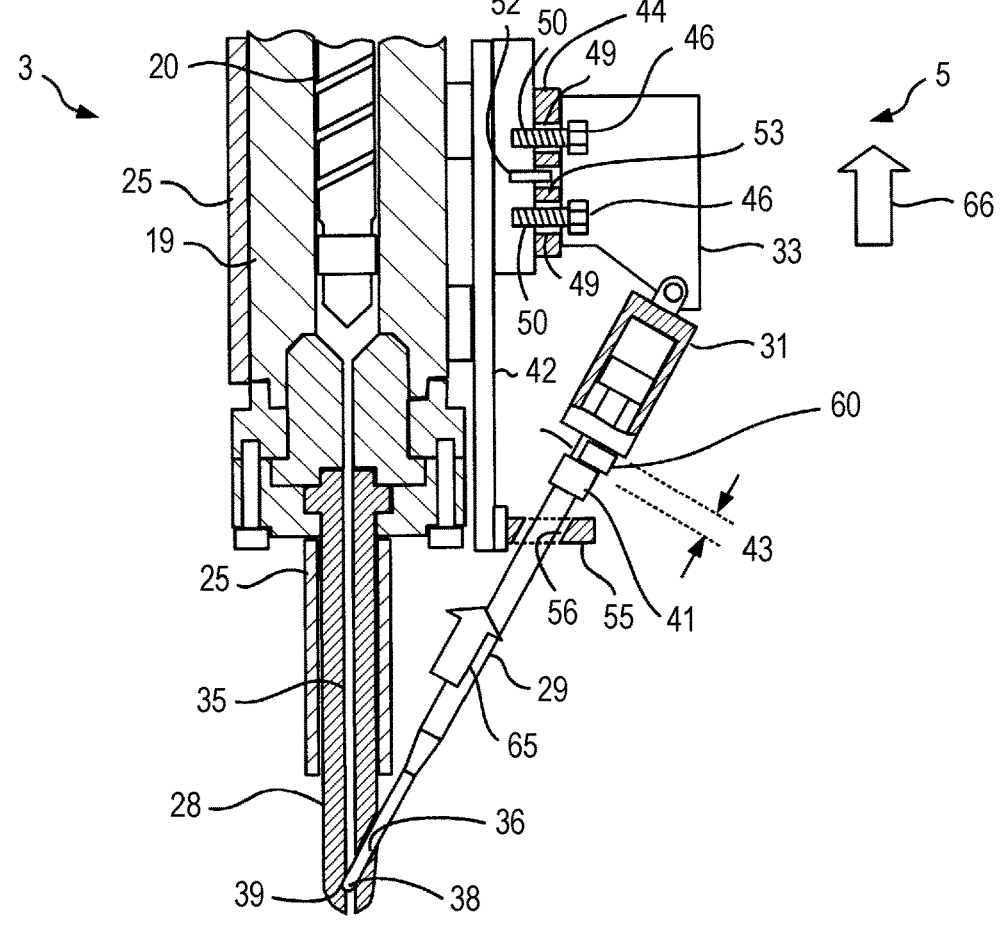
FIG. 7D is a front cross-sectional view of the shut-off nozzle according to the first illustrative embodiment.

After the temperatures of the heating cylinder 19 and the nozzle portion 28 are increased, as shown in FIG. 6, a needle valve most forward driving process (step S03) is performed. That is, as shown in FIG. 7B, the fluid is supplied to the cylinder unit 31 to drive the needle valve 29 to the most forward position. Then, as shown in FIG. 7C, the head portion 38 of the needle valve 29 is seated on the recess 39 of the needle hole 36 of the nozzle portion 28. A reaction force acts on the needle valve 29 in the direction of an arrow 65. Then, as shown in FIG. 7D, an upward force acts on the bracket 33 via the cylinder unit 31 as shown by an arrow 66. This force causes the bracket 33 to slide slightly upward against gravity.

The gauge 60 is inserted into the rod 40. It is confirmed whether the length 43 of the exposed rod 40 is appropriate. If the length is not appropriate, the needle valve 29 may not be in the most forward position. The needle valve 29 is made to slide smoothly in the needle hole 36 by applying vibration to the needle valve 29. Alternatively, the fastening bolts 46, 46 are loosened, and the needle valve 29 is manually moved forward and backward a plurality of times while shaking the needle valve 29 by hand. Further, after the fastening bolts 46, 46 are loosened, the guide portion 55 may be loosened to reduce the friction between the through hole 56 and the needle valve 29, and the needle valve 29 may be checked by moving forward and backward by supplying fluid to the cylinder unit 31 a plurality of times. The fluid is supplied to the cylinder unit 31 again, and the needle valve 29 is driven to the most forward position. When the gauge 60 can be inserted into the portion of the rod 40, the needle valve most forward driving process is completed.

Figure 7E:
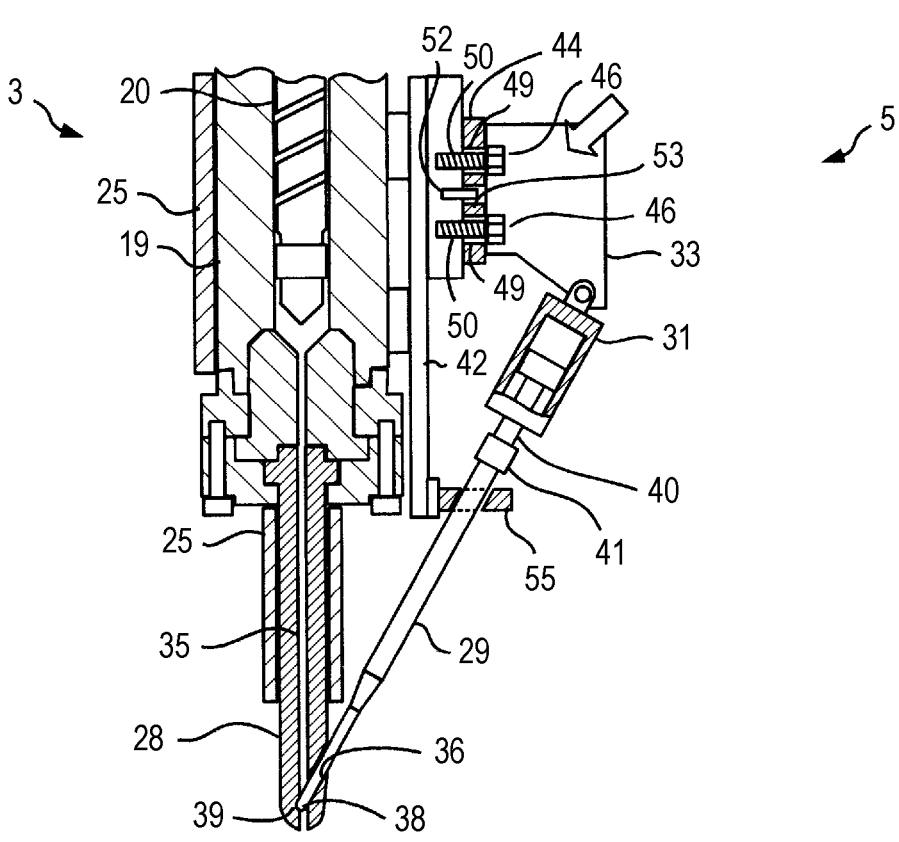
FIG. 7E is a front cross-sectional view of the shut-off nozzle according to the first illustrative embodiment.

As shown in FIG. 6, a fixing process (step S04) is performed. That is, as shown in FIG. 7E, the fastening bolts

46, 46 are fastened. Thus, the bracket 33 is fixed to the fixing member 42. The adjustment method for the shut-off nozzle 5 is completed.

Second Illustrative Embodiment

{Injection Molding Machine}

A second illustrative embodiment will be described. In the injection molding machine 1 according to the second illustrative embodiment, the mold clamping device 2, the injection device 3, and the control device 4 are configured similarly to the mold clamping device 2, the injection device 3, and the control device 4 in the injection molding machine 1 according to the first illustrative embodiment shown in FIG. 1. Therefore, the description thereof will be omitted.

{Shut-off Nozzle}

Figures 8, 9:
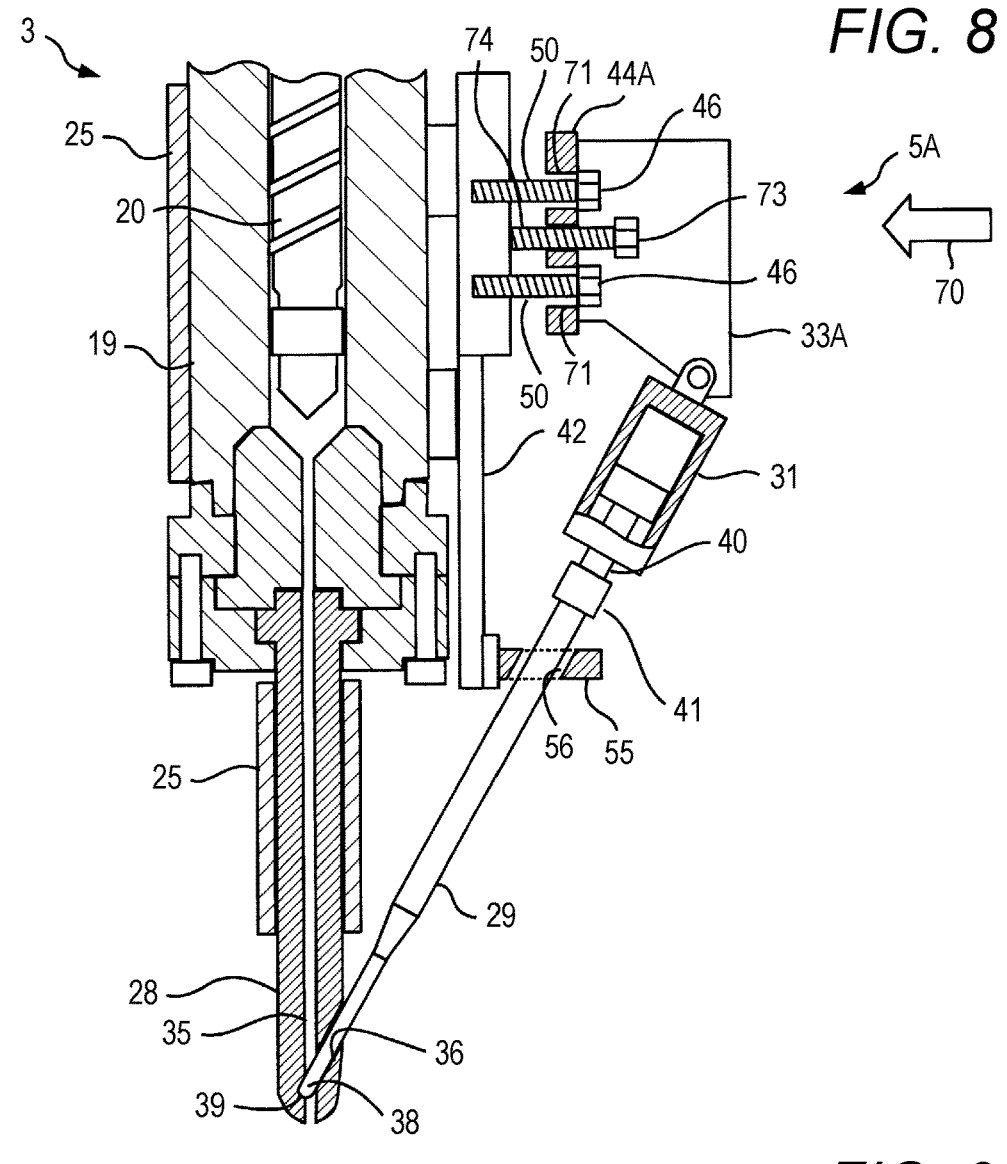
FIG. 8 is a front cross-sectional view of a shut-off nozzle according to a second illustrative embodiment.
FIG. 9 is a side view of a bracket of the shut-off nozzle according to the second illustrative embodiment.

A shut-off nozzle 5A according to the second illustrative embodiment is shown in FIG. 8. The shut-off nozzle 5A according to the second illustrative embodiment is different from the first illustrative embodiment in the structure of a bracket 33A. However, other members and structures are configured similarly to those of the shut-off nozzle 5 according to the first illustrative embodiment shown in FIG. 2. Accordingly, the description of the member structure having the same configuration will be omitted.

The bracket 33A of the shut-off nozzle 5A according to the second illustrative embodiment is also fixed to the fixing member 42 by the fastening bolts 46, 46, . . . as in the first illustrative embodiment, but it differs from the first illustrative embodiment in several points. FIG. 9 shows a state in which the bracket 33A is viewed from an arrow 70 in FIG. 8. A flange portion 44A of the bracket 33A has bolt holes 71, 71, . . . into which the shaft portions 50, 50, . . . of the fastening bolts 46, 46, . . . are inserted. In the second illustrative embodiment, the bolt holes 71, 71, . . . are long holes. Therefore, the bolt holes 71, 71, . . . allow the shaft portions 50, 50, . . . of the fastening bolts 46, 46, . . . to move only in the vertical direction. In the second illustrative embodiment, although the knock pins 52 and 52 (see FIGS. 2 and 3) provided in the first illustrative embodiment are not provided, the bracket 33A is allowed to slide in the vertical direction as in the first illustrative embodiment.

In the second illustrative embodiment, the bracket 33A is provided with vertical distance adjustment bolts 73, 73. FIG. 9 shows shaft portions 74, 74 of the vertical distance adjustment bolts 73, 73, that is, male screws, and female screws are formed in the flange portion 44A. The male screws are screwed into these female screws. As shown in FIG. 8, tip end portions of the shaft portions 74 and 74 of the vertical distance adjustment bolts 73 and 73 protrude from the flange portion 44A and are in contact with the fixing member 42. Accordingly, when the vertical distance adjustment bolts 73, 73 are rotated, the lengths of the protruding shaft portions 74, 74 are changed, and the height of the bracket 33A with respect to the fixing member 42 is changed. That is, a distance in a direction perpendicular to the axial direction of the shut-off nozzle 5A, that is, the vertical distance can be adjusted. The vertical distance adjustment bolts 73, 73 serve as a vertical distance adjustment unit.

{Adjustment Method for Shut-Off Nozzle}

Figure 10:
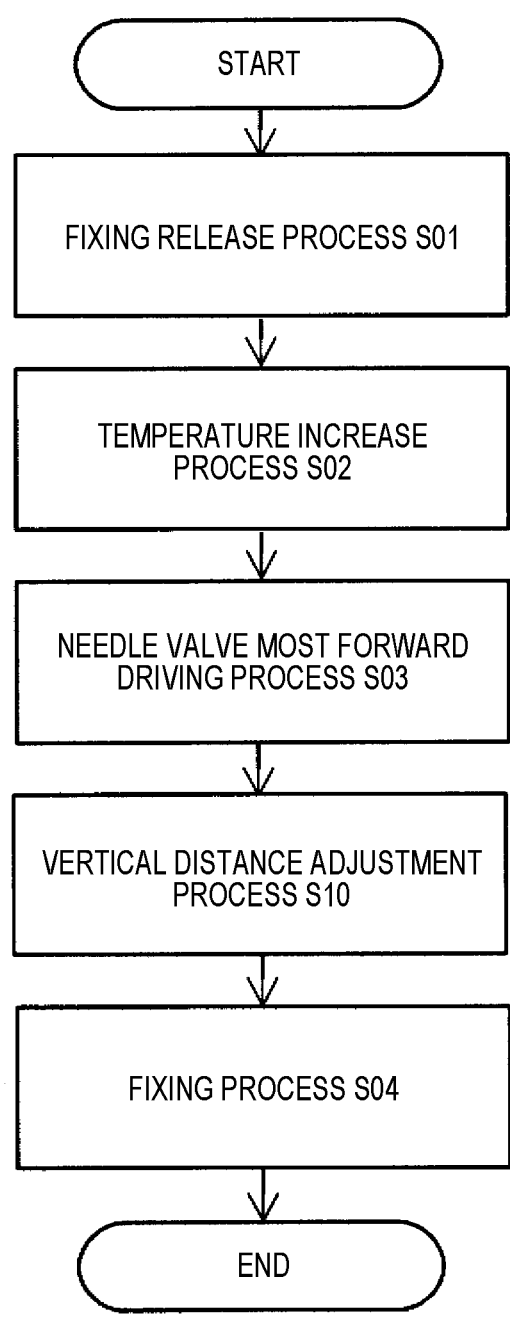
FIG. 10 is a flowchart showing an adjustment method for the shut-off nozzle according to the second illustrative embodiment.
Figure 11A:
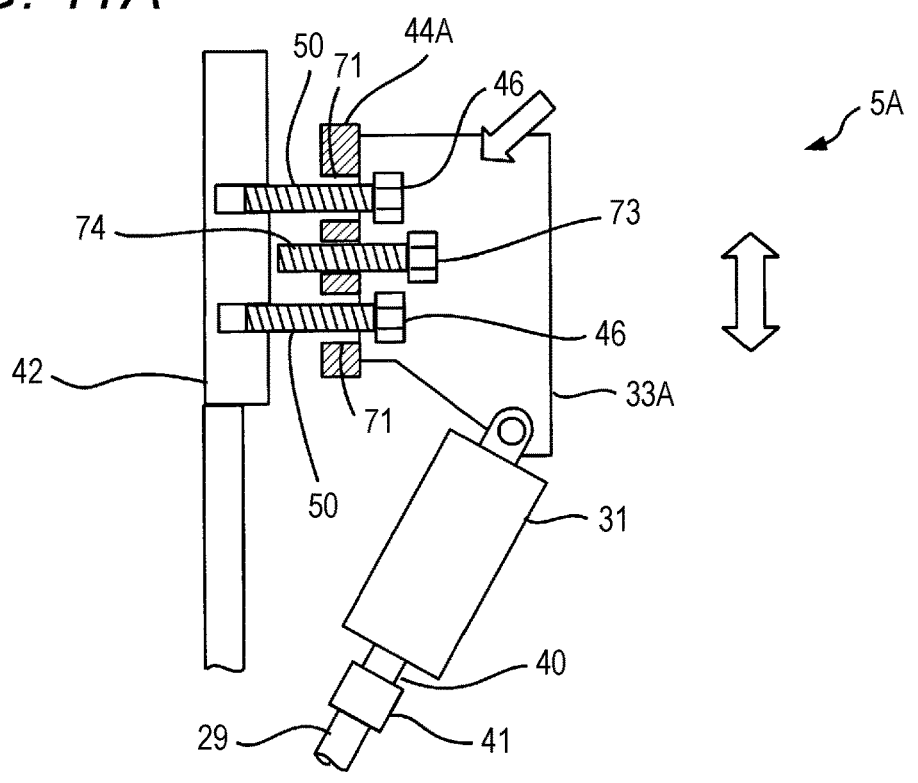
FIG. 11A is a front cross-sectional view showing a part of the shut-off nozzle according to the second illustrative embodiment.
Figure 11B:
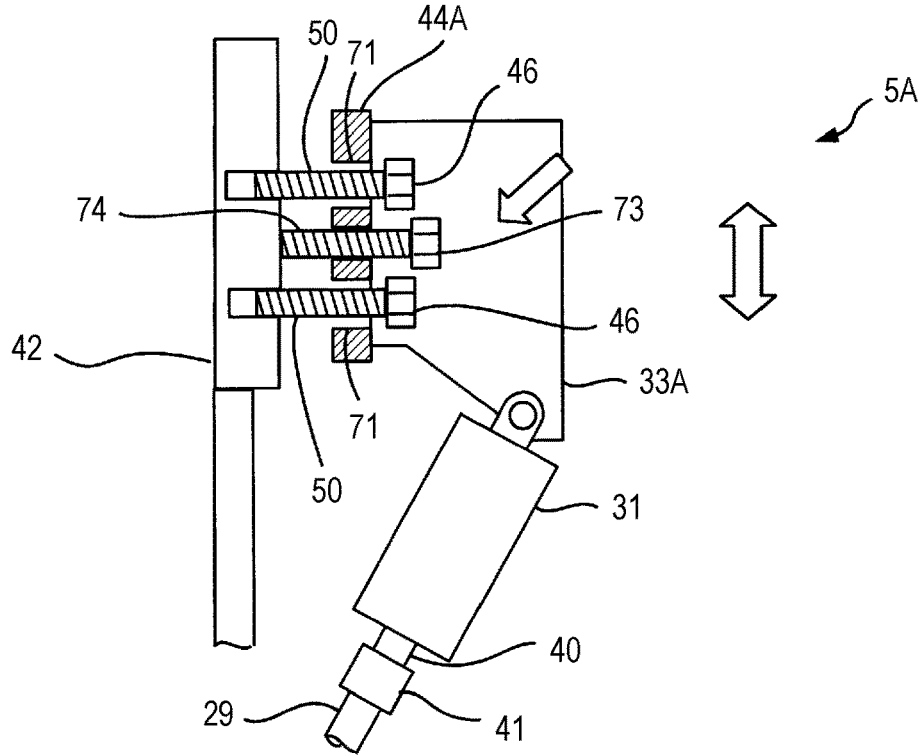
FIG. 11B is a front cross-sectional view showing the part of the shut-off nozzle according to the second illustrative embodiment.

An adjustment method for the shut-off nozzle 5A according to the second illustrative embodiment will be described. As shown in FIG. 10, a fixing release process (step S01) is performed. This process is similar to that of the first illustrative embodiment, and as shown in FIG. 11A, the fastening bolts 46, 46, . . . are loosened. Thus, the bracket 33A is allowed to slide in the vertical direction with respect to the fixing member 42. At this time, tip ends of the vertical distance adjustment bolts 73, 73 are separated from the fixing member 42. If the bracket 33A is rattling due to a gap between the tip end and the fixing member 42, as shown in FIG. 11B, the vertical distance adjustment bolts 73, 73 may be turned to eliminate the rattling. Alternatively, the vertical distance adjustment bolts 73, 73 may be turned to increase the gap. In any case, the bracket 33A can smoothly slide with respect to the fixing member 42.

As shown in FIG. 10, a temperature increase process (step S02) is performed. That is, as in the first illustrative embodiment, the heating cylinder 19 and the nozzle portion 28 are heated by the heaters 25, 25 (see FIG. 8). When the temperature is increased, a needle valve most forward driving process (step S03) is performed. That is, as in the first illustrative embodiment, the fluid is supplied to the cylinder unit 31 to drive the needle valve 29 to the most forward position. As described above, when the needle valve 29 is driven to the most forward position, the bracket 33A is slightly slid upward by the cylinder unit 31. The gauge 60 (see FIG. 5) is used as necessary to confirm that the cylinder unit 31 is driven to the most forward position.

Figure 11C:
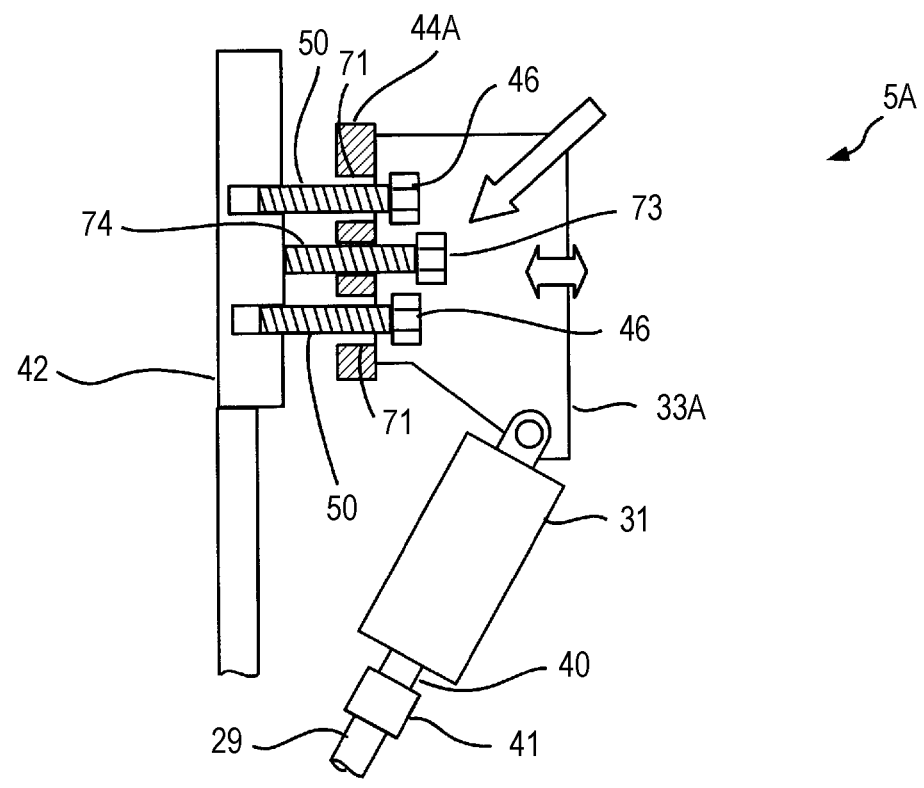
FIG. 11C is a front cross-sectional view showing the part of the shut-off nozzle according to the second illustrative embodiment.
Figure 11D:
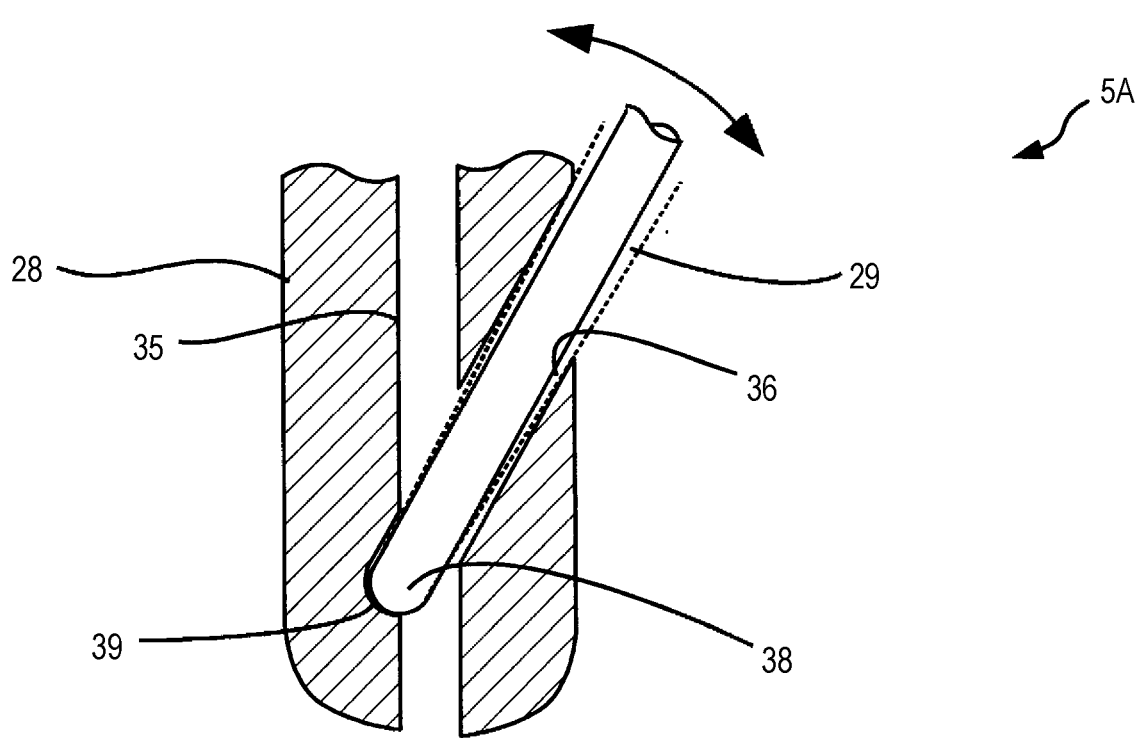
FIG. 11D is a front cross-sectional view showing a part of a nozzle portion and a part of a needle valve of the shut-off nozzle according to the second illustrative embodiment.

In the second illustrative embodiment, as shown in FIG. 10, a vertical distance adjustment process (step S10) is performed. That is, as shown in FIG. 11C, the vertical distance adjustment bolts 73 and 73 are rotated to adjust the vertical distance of the bracket 33A to the fixing member 42. Thus, as shown in FIG. 11D, the angle of the needle valve 29 can be adjusted. The angle of the needle valve 29 is adjusted to be coaxial with the needle hole 36. That is, the needle valve 29 is adjusted so as not to hit unevenly on an inner peripheral surface of the needle hole 36.

Figure 11E:
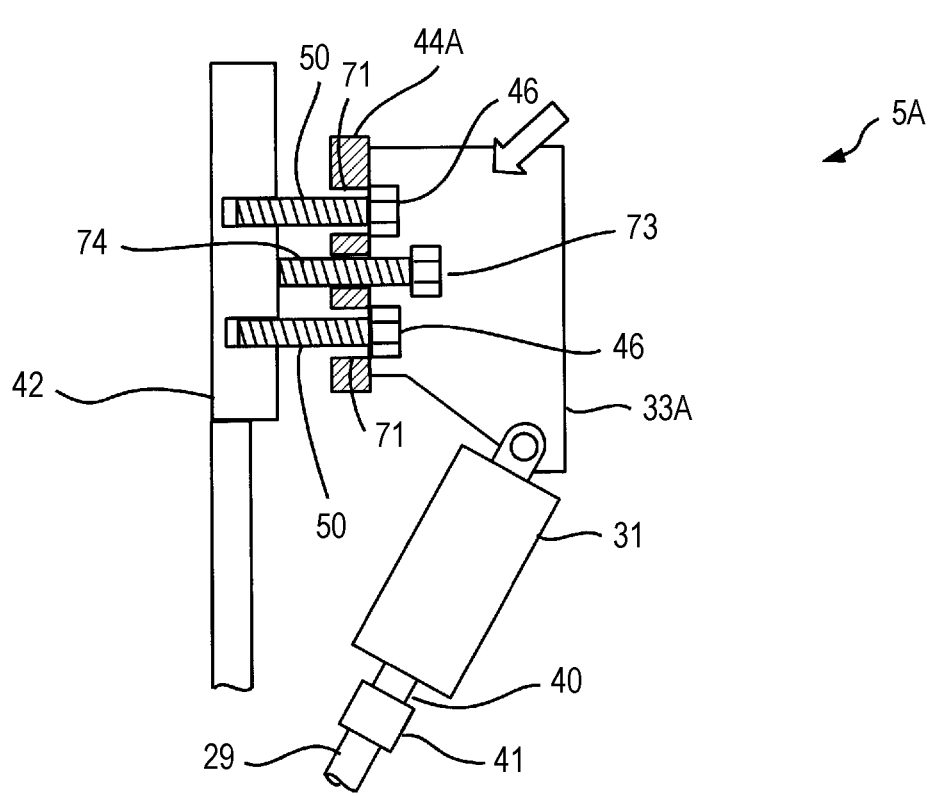
FIG. 11E is a front cross-sectional view showing the part of the shut-off nozzle according to the second illustrative embodiment.

Finally, a fixing process (step S04) is performed. As shown in FIG. 11E, the fastening bolts 46, 46, . . . are fastened. Thus, the bracket 33A is fixed to the fixing member 42. The adjustment method for the shut-off nozzle 5A according to the second illustrative embodiment is completed.

MODIFICATIONS

The second illustrative embodiment is different from the first illustrative embodiment in that the height of the bracket 33A with respect to the fixing member 42 can be adjusted by the vertical distance adjustment unit. The vertical distance adjustment unit can be modified. For example, the vertical distance adjustment bolts 73 and 73 may be provided with lock nuts so as not to be loosened. Further, two vertical distance adjustment bolts 73 and 73 are shown in FIG. 9, but four or other numbers of vertical distance adjustment bolts may be provided.

Although the invention made by the present inventors is specifically described based on the illustrative embodiments, it is needless to say that the present invention is not limited to the illustrative embodiments described above, and various modifications can be made without departing from the scope of the invention. The plurality of examples described above may be appropriately combined.

What is claimed is:

1. An adjustment method for a shut-off nozzle provided in an injection device, the shut-off nozzle comprising:

a nozzle portion having an injection flow path in an axial direction formed therein and a needle hole reaching the injection flow path from an outer peripheral surface of the nozzle portion;

a needle valve movably insertable into the needle hole to open and close the injection flow path;

a cylinder component configured to drive the needle valve in a moving direction;

a bracket configured to rotatably support the cylinder component at a rear end; and a fixing device configured to fix the bracket to a fixing member of the injection device, the adjustment method comprising:

releasing the fixing device to allow the bracket to slide by a predetermined width with respect to the fixing member;

heating the injection device and the nozzle portion by a heater;

driving the cylinder component to bring the needle valve to a most forward position and adjusting a slide position of the bracket; and fastening the fixing device to fix the bracket to the fixing member, wherein a knock pin is fixed to the fixing member, and the bracket has an elongated guide hole into which the knock pin is inserted, regulating a direction in which the bracket slides with respect to the fixing member in a state where the fixing device is released.

2. The adjustment method for a shut-off nozzle according to claim 1, wherein the fixing device is a fastening bolt, and the releasing of the fixing device is to loosen the fastening bolt, wherein a fastening bolt hole through which a shaft portion of the fastening bolt passes is formed in the bracket, and wherein the fastening bolt hole is formed as a hole having a diameter larger than a diameter of the shaft portion or as an elongated hole.

3. The adjustment method for a shut-off nozzle according to claim 1, wherein a head portion of the needle valve is formed in a hemispherical shape, and a tip end portion of the needle hole is formed in a spherical recess, and wherein the head portion is configured to be seated on the recess in a case where the needle valve is brought to the most forward position in the driving of the cylinder component.

4. The adjustment method for a shut-off nozzle according to claim 1, wherein the shut-off nozzle includes:

a vertical distance adjustment device configured to adjust a vertical distance, the vertical distance being a distance between the fixing member and the rear end of the cylinder component in a direction perpendicular to the axial direction, wherein the adjustment method further includes:

adjusting the vertical distance by the vertical distance adjustment device, and wherein the adjusting of the vertical distance is performed after the driving of the cylinder component is performed, and then the fastening of the fixing device is performed.

5. The adjustment method for a shut-off nozzle according to claim 4, wherein the vertical distance adjustment device includes a vertical distance adjustment bolt, the vertical distance adjustment bolt being screwed into a nut portion provided in the bracket, and a tip end of the vertical distance adjustment bolt protruding from the bracket and being in contact with the fixing member, and wherein in the adjusting of the vertical distance, the vertical distance is adjusted by adjusting a length of the vertical distance adjustment bolt protruding from the bracket.

6. A shut-off nozzle comprising:

a nozzle portion having an injection flow path in an axial direction formed therein and a needle hole reaching the injection flow path from an outer peripheral surface of the nozzle portion;

a needle valve movably inserted into the needle hole to open and close the injection flow path;

a cylinder component configured to drive the needle valve in a moving direction;

a bracket configured to rotatably support the cylinder component at a rear end; and a fixing device configured to fix the bracket to a fixing member of an injection device, wherein a knock pin is fixed to the fixing member, and the bracket has an elongated guide hole into which the knock pin is inserted, and wherein in a case where the fixing device is released, the bracket is allowed to slide by a predetermined width with respect to the fixing member with a slide direction thereof being regulated by the knock pin, and the bracket is configured to be fixed to the fixing member by the fixing device at any slide position.

7. The shut-off nozzle according to claim 6, wherein the fixing device includes a fastening bolt, wherein a fastening bolt hole through which a shaft portion of the fastening bolt passes is formed in the bracket, and wherein the fastening bolt hole is formed as a hole having a diameter larger than a diameter of the shaft portion or as an elongated hole.

8. The shut-off nozzle according to claim 6, wherein a head portion of the needle valve is formed in a hemispherical shape, a tip end portion of the needle hole is formed in a spherical recess, and wherein the head portion is configured to be seated on the recess in a case where the needle valve is driven to a most forward position.

9. The shut-off nozzle according to claim 6, wherein the shut-off nozzle includes:

a vertical distance adjustment device configured to adjust a vertical distance, the vertical distance being a distance between the fixing member and the rear end of the cylinder component in a direction perpendicular to the axial direction.

10. The shut-off nozzle according to claim 9, wherein the vertical distance adjustment device includes a vertical distance adjustment bolt, the vertical distance adjustment bolt being screwed into a nut portion provided in the bracket, a tip end of the vertical distance adjustment bolt protruding from the bracket and being in contact with the fixing member, and wherein the vertical distance is configured to be adjusted by adjusting a length of the vertical distance adjustment bolt protruding from the bracket.

11. An injection device comprising:

a heating cylinder;

a screw provided in the heating cylinder; and a shut-off nozzle provided in the heating cylinder, the shut-off nozzle including:

a nozzle portion having an injection flow path in an axial direction formed therein and a needle hole reaching the injection flow path from an outer peripheral surface of the nozzle portion;

a needle valve movably inserted into the needle hole to open and close the injection flow path;

a cylinder component configured to drive the needle valve in a moving direction;

a bracket configured to rotatably support the cylinder component at a rear end; and a fixing device configured to fix the bracket to a fixing member of the injection device, wherein a knock pin is fixed to the fixing member, and the bracket has an elongated guide hole into which the knock pin is inserted, and wherein in a case where the fixing device is released, the bracket is allowed to slide by a predetermined width with respect to the fixing member with a slide direction thereof being regulated by the knock pin, and the bracket is configured to be fixed to the fixing member by the fixing device at any slide position.

12. The injection device according to claim 11, wherein the fixing device includes a fastening bolt, wherein a fastening bolt hole through which a shaft portion of the fastening bolt passes is formed in the bracket, and wherein the fastening bolt hole is formed as a hole having a diameter larger than a diameter of the shaft portion or as an elongated hole.

13. The injection device according to claim 11, wherein a head portion of the needle valve is formed in a hemispherical shape, a tip end portion of the needle hole is formed in a spherical recess, and wherein the head portion is configured to be seated on the recess in a case where the needle valve is driven to a most forward position.

14. The injection device according to claim 11, wherein the shut-off nozzle includes:

a vertical distance adjustment device configured to adjust a vertical distance, the vertical distance being a distance between the fixing member and the rear end of the cylinder component in a direction perpendicular to the axial direction.

15. The injection device according to claim 14, wherein the vertical distance adjustment device includes a vertical distance adjustment bolt, the vertical distance adjustment bolt being screwed into a nut portion provided in the bracket, a tip end of the vertical distance adjustment bolt protruding from the bracket and being in contact with the fixing member, and wherein the vertical distance is configured to be adjusted by adjusting a length of the vertical distance adjustment bolt protruding from the bracket.

16. An injection molding machine comprising:

a mold clamping device configured to clamp a mold; and an injection device configured to inject an injection material, the injection device including:

a heating cylinder;

a screw provided in the heating cylinder; and a shut-off nozzle provided in the heating cylinder, the shut-off nozzle including:

a nozzle portion having an injection flow path in an axial direction formed therein and a needle hole reaching the injection flow path from an outer peripheral surface of the nozzle portion;

a needle valve movably inserted into the needle hole to open and close the injection flow path;

a cylinder component configured to drive the needle valve in a moving direction;

a bracket configured to rotatably support the cylinder component at a rear end; and a fixing device configured to fix the bracket to a fixing member of the injection device, wherein a knock pin is fixed to the fixing member, and the bracket has an elongated guide hole into which the knock pin is inserted, and wherein in a case where the fixing device is released, the bracket is allowed to slide by a predetermined width with respect to the fixing member with a slide direction thereof being regulated by the knock pin, and the bracket is configured to be fixed to the fixing member by the fixing device at any slide position.

* * * * *